(12) United States Patent
Tanaka et al.

(10) Patent No.: US 10,464,216 B2
(45) Date of Patent: Nov. 5, 2019

(54) OBJECT HOLDING APPARATUS WITH SUCTION DEVICE AND PROXIMAL SENSOR

(71) Applicant: KABUSHIKI KAISHA TOSHIBA, Minato-ku (JP)

(72) Inventors: Junya Tanaka, Tokyo (JP); Keisuke Kamata, Fuchu (JP); Kohei Nara, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/900,146

(22) Filed: Feb. 20, 2018

(65) Prior Publication Data

US 2019/0077027 A1 Mar. 14, 2019

(30) Foreign Application Priority Data

Sep. 12, 2017 (JP) ................. 2017-174958

(51) Int. Cl.
| | |
|---|---|
| *B25J 15/06* | (2006.01) |
| *B25J 13/08* | (2006.01) |
| *B64D 1/00* | (2006.01) |
| B25J 9/16 | (2006.01) |
| B64C 39/02 | (2006.01) |

(52) U.S. Cl.
CPC ......... *B25J 15/0641* (2013.01); *B25J 13/081* (2013.01); *B25J 13/086* (2013.01); *B25J 15/0625* (2013.01); *B64D 1/00* (2013.01); *B25J 9/162* (2013.01); *B25J 9/1697* (2013.01); *B64C 39/022* (2013.01); *B64C 39/024* (2013.01); *B64C 2201/108* (2013.01); *B64C 2201/128* (2013.01); *Y10S 901/01* (2013.01); *Y10S 901/40* (2013.01); *Y10S 901/46* (2013.01); *Y10S 901/47* (2013.01)

(58) Field of Classification Search
CPC ...... B25J 15/0641; B25J 9/162; B25J 13/086; B64D 1/00
USPC .................................................. 294/183, 185
See application file for complete search history.

(56) References Cited

U.S. PATENT DOCUMENTS

| | | | |
|---|---|---|---|
| 4,662,668 A | 5/1987 | Hufford | |
| 5,953,812 A * | 9/1999 | Ferrante | H05K 13/0413 29/714 |
| 5,984,623 A * | 11/1999 | Smith | B65G 61/00 294/104 |

(Continued)

FOREIGN PATENT DOCUMENTS

| | | |
|---|---|---|
| JP | 5-23989 | 2/1993 |
| JP | 6-263068 | 9/1994 |

(Continued)

*Primary Examiner* — Paul T Chin
(74) *Attorney, Agent, or Firm* — Oblon, McClelland, Maier & Neustadt, L.L.P.

(57) ABSTRACT

According to one embodiment, an object holding apparatus includes a suction device, a suction pad, and a proximal sensor. The suction device is configured to suction gas. The suction pad is connected to the suction device, and is configured to hold an object based on suction by the suction device. The proximal sensor is configured to detect that the object is in close proximity to the suction pad. The suction device is controlled to perform suction when the proximal sensor detects that the object is in close proximity to the suction pad.

10 Claims, 14 Drawing Sheets

(56) References Cited

U.S. PATENT DOCUMENTS

| | | | | |
|---|---|---|---|---|
| 6,015,174 A | * | 1/2000 | Raes | B25J 15/0253 |
| | | | | 294/119.1 |
| 7,309,089 B2 | * | 12/2007 | Perlman | B25B 11/005 |
| | | | | 294/189 |
| 7,673,914 B2 | * | 3/2010 | Liao | F16B 47/00 |
| | | | | 116/70 |
| 7,963,578 B2 | * | 6/2011 | Wells | B66C 1/0212 |
| | | | | 294/2 |
| 2004/0094979 A1 | * | 5/2004 | Damhuis | B25J 15/0052 |
| | | | | 294/65 |
| 2005/0168001 A1 | * | 8/2005 | Perlman | B25B 11/005 |
| | | | | 294/189 |
| 2010/0296903 A1 | * | 11/2010 | Shah | H01L 21/6838 |
| | | | | 414/589 |
| 2011/0067504 A1 | | 3/2011 | Koyama et al. | |
| 2015/0066199 A1 | | 3/2015 | Shimono | |
| 2017/0080571 A1 | * | 3/2017 | Wagner | B25J 9/1694 |

FOREIGN PATENT DOCUMENTS

| | | |
|---|---|---|
| JP | 2004-349454 | 12/2004 |
| JP | 5089774 | 12/2012 |
| JP | 2015-47681 | 3/2015 |

* cited by examiner

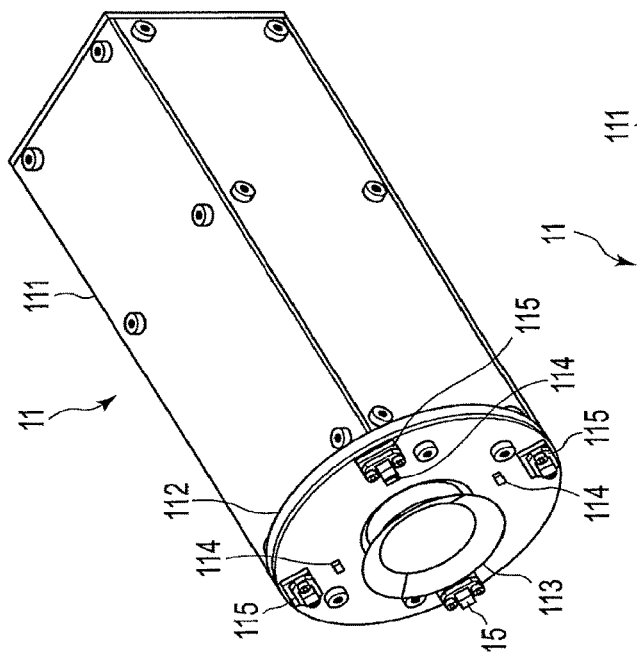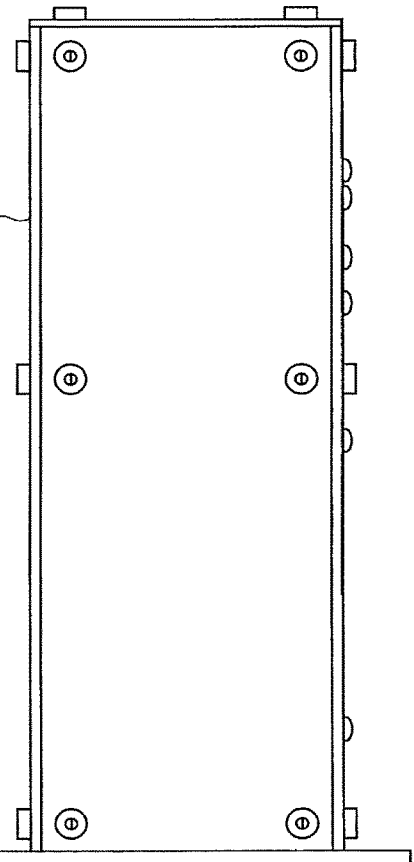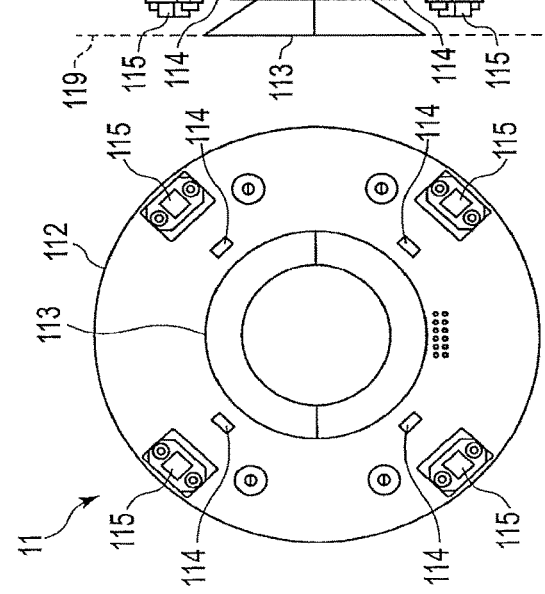

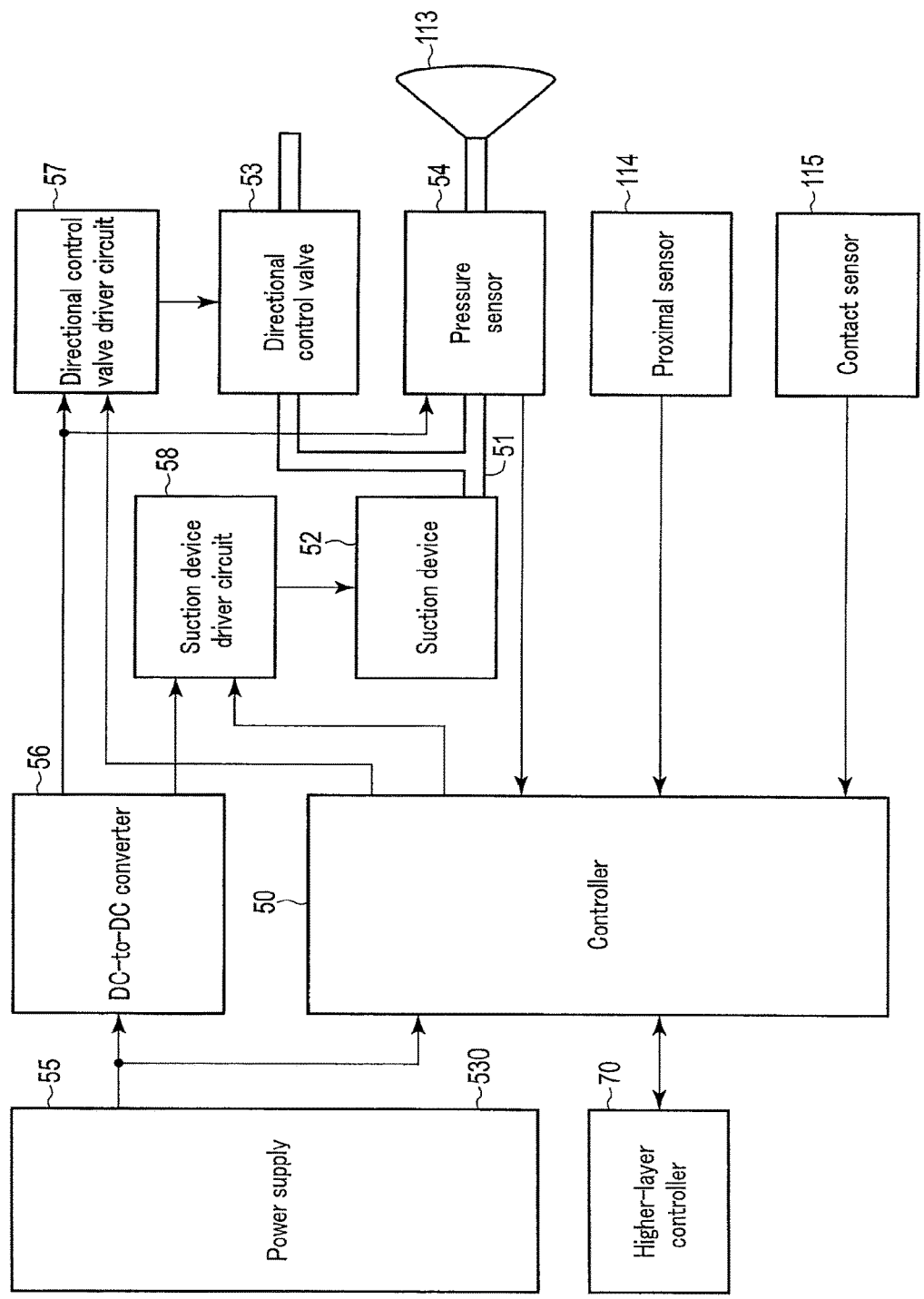
F I G. 5

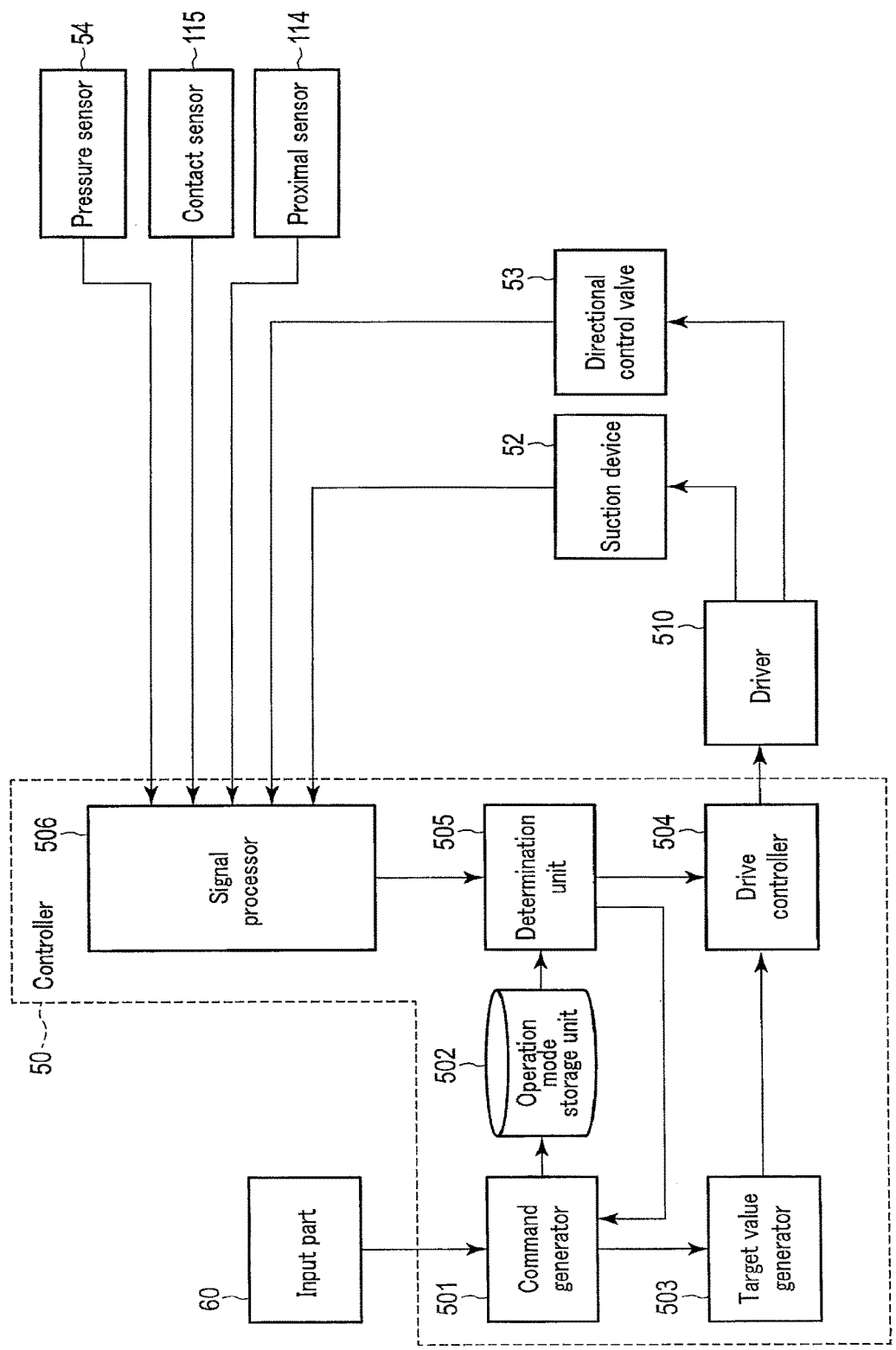
F I G. 8

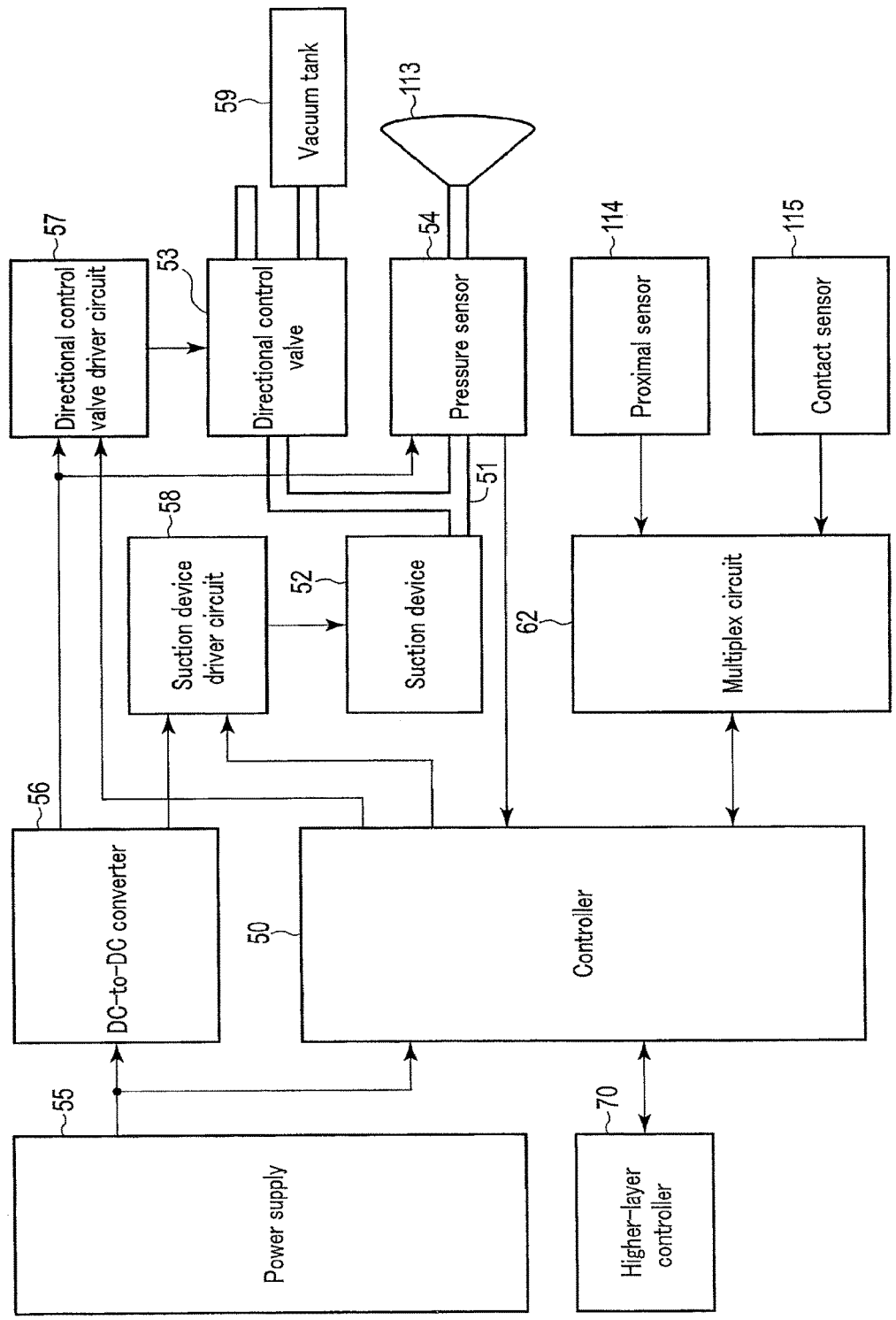
F I G. 12

OBJECT HOLDING APPARATUS WITH SUCTION DEVICE AND PROXIMAL SENSOR

CROSS-REFERENCE TO RELATED APPLICATIONS

This application is based upon and claims the benefit of priority from Japanese Patent Application No. 2017-174958, filed Sep. 12, 2017, the entire contents of which are incorporated herein by reference.

FIELD

Embodiments described herein relate generally to a handling robot system using an object holding apparatus.

BACKGROUND

In the current physical distribution field, there is a trend that a handling amount of packages has been increasing in accordance with the expansion of the mail order market. Therefore, logistics companies have been currently working on automation of the logistics system.

Stationary manipulators are known as an apparatus that performs a transfer operation to move packages to a different place, which is also referred to as discharging, unloading, depalletizing, and picking. When using such manipulators, the operating range is limited. In addition, manipulators that include a mobile cart may be assumed; however, the operating range is also limited due to the following problems: for example, in the case where the cart moves to a work place other than a flat area, the cart has to move over physical impediments such as stairs; and when moving through a passage, since an ambient environment has to ensure a sufficient moving space to avoid the cart from coming in contact with the surrounding environment, the area of passage occupation tends to increase.

Under the above circumstances, it is expected to utilize an aerial vehicle (for example, a drone) that can move freely in the air over a wide area. In order to implement an aerial vehicle that performs the transfer operation, an object holding mechanism applicable to the aerial vehicle is necessary.

BRIEF DESCRIPTION OF THE DRAWINGS

FIGS. 2A, 2B and 2C are a perspective view, a front view, and a side view illustrating external appearances of the object holding apparatus shown in FIG. 1.

FIG. 5 is a block diagram illustrating a control system of the object holding apparatus shown in FIG. 1.

FIG. 8 is a block diagram showing a controller shown in FIG. 5 in detail.

FIG. 12 is a block diagram showing an object holding apparatus according to the third embodiment.

DETAILED DESCRIPTION

Figure 1:
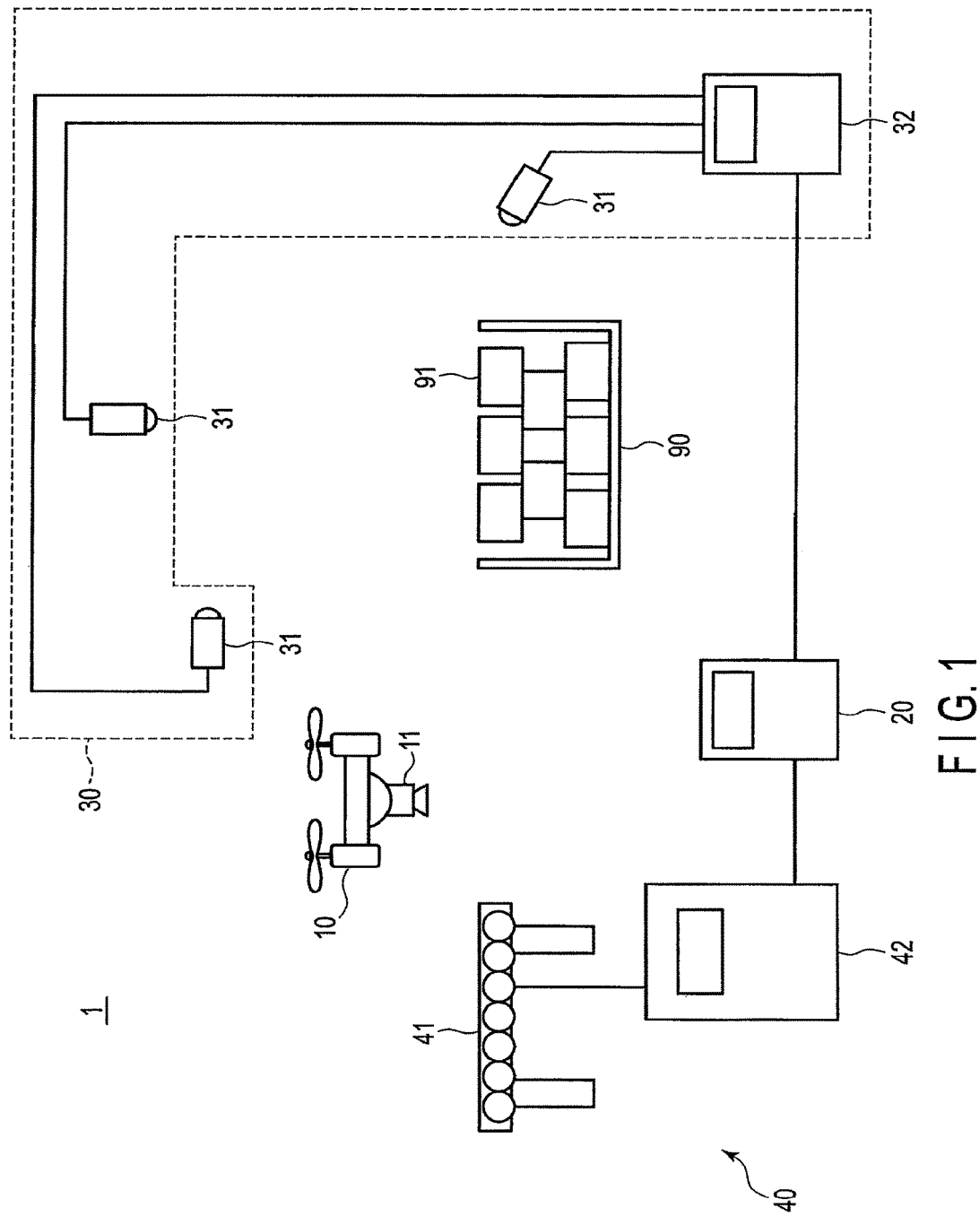
FIG. 1 is a schematic diagram illustrating an example of a handling robot system using an object holding apparatus according to the first embodiment.

According to one embodiment, an object holding apparatus includes a suction device, a suction pad, and a proximal sensor. The suction device is configured to suction gas. The suction pad is connected to the suction device, and is configured to hold an object based on suction by the suction device. The proximal sensor is configured to detect that the object is in close proximity to the suction pad. The suction device is controlled to perform suction when the proximal sensor detects that the object is in close proximity to the suction pad.

Hereinafter, embodiments will be described with reference to the drawings. Throughout the drawings, the same elements will be denoted by the same reference symbols, and redundant descriptions will be omitted. The drawings are schematic or conceptual, and the relationships between thickness and width, the ratio between sizes of elements, etc. in the drawings may be different in actual implementation. Where the same element is illustrated in different drawings, the dimensions and scales may be different between the drawings.

First Embodiment

FIG. 1 is a schematic diagram of an example of a handling robot system 1 using an object holding apparatus (also referred to as an object holding mechanism) 11 according to the first embodiment. As shown in FIG. 1, the handling robot system 1 includes a flight device 10, a robot controller 20, a recognition device 30, and a conveyor 40.

The handling robot system 1 recognizes objects 91 loaded in a loading area 90 by the recognition device 30. The robot controller 20 controls the flight device 10 based on a recognition result by the recognition device 30, and the flight device 10 thereby holds a target object 91 to be transferred and places the object 91 on the conveyor 40. In contrast, the flight device 10 may be controlled to transfer an object 91 to the loading area 90 from the conveyor 40. The object may be referred to as a package, an article, a work, etc. The object may be, for example, a product placed in a corrugated box, a packaged product, a product itself, etc.

First, the flight device 10 will be explained.

The flight device 10 is an aerial vehicle that is capable of freely moving in a three-dimensional space. The flight device 10 is provided with the object holding apparatus 11 configured to hold an object 91. The object holding apparatus 11 includes at least one holding part that is capable of holding an object. The object holding apparatus 11 is arranged so that the holding part is directed outward relative to the flight device 10. The holding part includes, for example, a suction pad, and holds or attracts an object by suction. The holding part may be a type of holding part that holds or attracts an object by magnetic force generated by an electromagnet. The object holding apparatus 11 will be described later in detail.

The flight device 10 includes a rotary wing or a propeller to fly. The flight device 10 can hover to maintain a given altitude, for example. A rotary joint of the rotary wing includes, for example, a motor, an encoder, a decelerator, etc. The joint is not limited for a uniaxial rotation, but may also be a biaxial rotation. The flight device 10 is movable to any position in the three-dimensional space by driving a motor. Accordingly, the object holding apparatus 11 arranged in the flight device 10 can be moved. The flight device 10 is, for example, a so-called drone. The flight device 10 may be a wired type or a wireless type. For a wireless type of flight device 10, a battery used as a power source for flight needs to be mounted. For a wired type of flight device 10, an active area is limited due to wiring connected to a ground facility.

Next, the recognition device 30 will be explained.

The recognition device 30 recognizes the objects 91 loaded in the loading area 90. The recognition device 30 includes image sensors 31, and a calculator 32 connected to the image sensors 31. The image sensors 31 are placed, for example, diagonally in front of, above, and diagonally in the rear of the objects 91 loaded in the loading area 90. The image sensors 31 may be stationary or movable. A distance image sensor or a camera capable of measuring three-dimensional locations such as an infrared dot pattern projection type camera, etc. may be used as the image sensors 31. The infrared dot pattern projection type camera projects an infrared dot pattern to capture infrared images of the objects 91 loaded in the loading area 90. Three-dimensional information of the objects 91 can be obtained by analyzing the infrared images. The infrared dot pattern projection type camera may further capture a color image or a black-and-white image. In addition to the infrared dot pattern projection type camera, the image sensor 31 may further include an optical sensor, such as a camera for taking color or black-and-white images. The image may be image data of a generally used format such as jpg, gif, png or bmp, for example.

In an example shown in FIG. 1, three image sensors 31 are provided; however, the number of the image sensors 31 may be one, two, or four or more. At least one of the image sensors 31 may be provided in the flight device 10. An image captured by the image sensor 31 provided in the flight device 10 is transmitted to the calculator 32 by wiring or wirelessly.

The calculator 32 calculates a three-dimensional position and orientation of objects 91 based on image data output from the image sensors 31. The position orientation information indicating the calculated position and orientation is output to the robot controller 20. The robot controller 20 controls the flight device 10 based on the position orientation information. The calculator 32 includes, for example, a CPU (central processing unit), a memory, and an auxiliary memory. A function of the calculator 32, for example, a function of calculating a three-dimensional positional orientation of an object, is implemented by the CPU executing a program, for example. A part of, or all functions of the calculator 32 may be implemented by hardware circuitry such as an ASIC (Application Specific Integrated Circuits), a PLD (Programmable Logic Device), or an FPGA (Field Programmable Gate Array).

Next, the conveyor 40 will be explained.

The flight device 10 places an object 91 on the conveyor 40, and the conveyor 40 conveys the object 91. The conveyor 40 includes, for example, a belt conveyor 41 and a conveyor controller 42. The belt conveyor 41 includes rollers arranged in a predetermined direction, and a belt wound around the rollers. The belt conveyor 41 drives the belt by rotating the rollers to convey the objects 91. The conveyor 40 may include a roller conveyor or a sorter instead of the belt conveyor 41.

The conveyor controller 42 controls driving of the belt conveyor 41. The conveyor controller 42 controls, for example, a conveyance speed and a conveyance direction. The conveyor controller 42 is a computer that includes, for example, a CPU, a memory, and an auxiliary memory. The conveyor controller 42 executes a preset program by the CPU, and controls the operation of the belt conveyor 41 in accordance with the program. The operation of the belt conveyor 41 may be controlled by manually operating the conveyor controller 42 by an operator.

The loading area 90 is an area where objects 91 are stacked or loaded. The loading area 90 may be a cage cart, a steel cart, a box pallet, a pallet, a shelf, etc.

FIGS. 2A, 2B, and 2C are respectively a perspective view, a front view, and a side view of the external appearance of the object holding apparatus 11. As shown in FIGS. 2A, 2B, and 2C, the object holding apparatus 11 includes a housing 111, a sensor-mounting member 112, a suction pad (also referred to as a suction disk) 113, a proximal sensor 114, and a contact sensor 115. In this example, four proximal sensors 114 and four contact sensors 115 are provided. The number of the proximal sensors 114 may be one, two, three, or five or more. The number of the contact sensors 115 may also be the same. The number of the proximal sensors 114 may be different from the number of the contact sensors 115. In addition, a plurality of suction pads 113 may be provided.

The housing 111 has, for example, a box shape, and houses elements such as a suction device, a controller, and a power source described below. The sensor-mounting member 112 includes the proximal sensors 114 and the contact sensors 115 on its main surface (also referred to as a detected surface). The sensor-mounting member 112 is provided as a surface of the housing 111. The sensor-mounting member 112 has, for example, a ring shape. The suction pad 113 is provided at the main surface side of the sensor-mounting member 112, and is connected to the suction device inside of the housing 111 through an aperture of the sensor-mounting member 112. The object holding apparatus 11 is configured as a component including the power source and the controller, and accordingly, the object holding apparatus 11 can autonomously operate as a single unit.

The proximal sensor 114 detects that an object is in close proximity to the suction pad 113. The suction pad 113 and the proximal sensor 114 are placed at the main surface side of the sensor-mounting member 112, and accordingly, proximity of the object to the proximal sensor 114 can be regarded as proximity of the object to the suction pad 113.

A distance sensor, for example, can be adopted as the proximal sensor 114. The distance sensor measures a distance to a target object in a non-contact manner. The distance sensor may be an active-type optical ranging sensor, a reflection-type photo sensor, an optical TOF (Time-Of-Flight) type optical ranging sensor, etc.

The active-type optical ranging sensor illuminates the target object with light from a light source such as an LED (Light Emitting Diode) etc., and detects light reflected by the target object by an optical detection element, to output a signal according to the distance to the target object. The active-type optical ranging sensor includes a PSD (Position Sensitive Detector) as an example. The PSD is an optical triangulation type optical ranging sensor that is capable of simply measuring a distance to the target object.

The reflection-type photo sensor includes an LED and a photodiode. The LED emits a predetermined amount of detection light based on a driving signal supplied from an analog circuit. In the case where the target object is placed in the vicinity of the reflection-type photo sensor, detection light is reflected by the target object. The light reflected from the target object is detected by the photodiode. The photodiode generates a detection current corresponding to the amount of received light (intensity of reflected light). The intensity of reflected light becomes larger as the distance between the object and the photodiode becomes smaller. Accordingly, the detection signal representing the distance to the target object can be obtained. The analog circuit controls the light amount of detection light of the LED to be a predetermined amount, generates a detection signal corresponding to a detection current obtained from the photodiode, and supplies the detection signal to the controller. The controller can calculate the distance to the object based on the received detection signal.

The optical TOF type optical ranging sensor measures a distance by measuring time until the reflected light bounces back. With the TOF technique, pulse light is emitted from the light source toward a target object, and the pulse light reflected by the target object is detected by the optical detection element to measure a time difference between a pulse light emission time and a detection time. The time difference ($\Delta t$) is a time required for pulse light to travel a distance of two-fold of distance d to the target object ($2 \times d$) by the speed of light ($=c$), and $d=(c \times \Delta t)/2$ is satisfied. The time difference ($\Delta t$) may be referred to as a phase difference between an emission pulse from the light source and a detection pulse. By detecting the phase difference, the distance d to the target object can be obtained. The TOF technique realizes a range measurement more accurate than the technique of measuring a range based on the intensity of the reflective light. In addition, the TOF technique is resistant to influence of the surface state of the target object and realizes stable ranging.

A sensor that determines presence or absence of an object may be used as the proximal sensor 114. This type of sensor includes a reflection-type photoelectric sensor. The photoelectric sensor includes a light source and an optical detection element. The photoelectric sensor projects light such as infrared rays to a target object from the light source, and receives by the optical detection element reflected light which has been reflected from the target object and in which the light amount has been reduced. The photoelectric sensor detects that the target object is placed within a predetermined distance from the photoelectric sensor if the amount of light received by the optical detection element is equal to or greater than a threshold. If the target object is deviated from the predetermined distance from the photoelectric sensor, the attenuation of the amount of light reflected from the target object becomes large, and the amount of light received by the optical detection element becomes less than the threshold. Accordingly, the photoelectric sensor detects that the target object is not placed within the predetermined distance from the photoelectric sensor. The photoelectric sensor, for example, outputs a detection signal while the target object is placed within the predetermined distance, and does not output a detection signal if the target object is not placed within the predetermined distance.

The proximal sensor 114 is not limited to a photoelectric type sensor, but may be another type of sensor such as an electrostatic capacity type or a ultrasonic type sensor.

The contact sensor 115 detects that an object is brought into contact with the suction pad 113. For example, the contact sensor 115 includes a sensor surface, and detects contact of the object to the sensor surface. The contact sensor 115 is arranged in a plane 119 (FIG. 2C) that includes the suction surface plane of the suction pad 113 or is closer to the sensor-mounting member 112 side than the plane 119. Accordingly, in the state where the object is in contact with the sensor surface of the contact sensor 115, the object is in contact with the suction pad 113. If the object is in contact with the sensor surface, the object is regarded as being in contact with the suction pad 113. For example, the contact sensor 115 outputs a detection signal while contact with the object (contact state) is detected, and does not output a detection signal while contact with the object is not detected.

There are various detection methods such as a method to convert the contact state into an electrical signal, as follows: a mechanical displacement method that detects a contact force based on displacement or deformation of a mechanical structure such as a spring; a resistance value change method that utilizes properties that an electrical resistance value is changed if a contact force is applied to a strain gauge or a pressure-sensitive conductive rubber; an electrostatic capacity change method in that a capacitor is formed by holding a dielectric having an elastic property by two electrodes, and properties that the electrostatic capacity is changed by displacement of the dielectric due to a compression force are utilized; a charge change method that utilizes a piezoelectric effect in that a charge is generated on a crystal surface if pressure is applied to a crystal of a ferroelectric element; an optical method that uses a change in light reflection rate due to deformation of an elastic body, a change in scattering rate of a light guide plate which light penetrates, and replacement measurement of a marker in an elastic body, etc.; a piezoresistance effect method that utilizes a semiconductor crystal as a contact force/resistance conversion element by using a piezoresistance effect in which the electric resistance is changed due to applied pressure; and a magnetic change method in which a magnetic induction type magnetic resistance element and an elastic body including a micro-magnet are combined, and which detects a change in a magnetic field due to deformation of the elastic bodies as an output change, etc.

As shown in FIG. 2B, the proximal sensors 114 and the contact sensors 115 are arranged outboard in comparison with the suction pad 113. The suction pad 113 has a circular shape in a plan view. The proximal sensors 114 are arranged on a circumference concentric with the suction pad 113, and are separated from each other by 90 degrees. The contact sensors 115 are arranged outboard of the proximal sensors 114 on a circumference concentric with the suction pad 113, and are separated from each other by 90 degrees. For example, if the proximal sensors 114 are photoelectric sensors, the proximal sensors 114 are arranged so that light emitted from the proximal sensors 114 intersects essentially vertically the plane 119 including the suction surface of the suction pad 113. For example, the contact sensors 115 are arranged so that a contact detection direction of the contact sensors 115 intersects essentially vertically the plane 119 including the suction surface of the suction pad 113. The arrangements of the proximal sensors 114 and the contact sensors 115 are not limited to those shown in FIG. 2B, but may be any arrangements.

The proximal sensors 114 realize object fall detection, suitable suction area detection, prevention of overpressure of the suction pad 113, and prevention of collision with an obstacle. If detection is failed by the proximal sensors 114, the contact sensors 115 detect a contact with an object, and accordingly, the object can be reliably detected.

The proximal sensors 114 are used as a loading sensor that detects an object suctioned by the suction pad 113. The proximal sensors 114 can measure a distance within an area from an end of the suction pad 113 to a predetermined distance away from the end. The proximal sensors 114 detect whether an object is placed within a range of a predetermined distance from the main surface of the sensor-mounting member 112. By distributing the proximal sensors 114 having the above configuration in an in-plane direction of the sensor-mounting member 112, it is possible to recognize contour information (dimension and/or shape) of an object held by the suction pad 113, based on distance information from the proximal sensors 114.

When the object holding apparatus 11 moves (in the downward direction or in the horizontal direction), if an obstacle is placed on the moving path, the proximal sensors 114 can detect the obstacle to prevent a collision.

In addition, when an object is held by the suction pad 113, it is assumed that the proximal sensors 114 positioned in an area in accordance with the contour of the object detect the object (ranging: proximal range). Accordingly, in the case where all the proximal sensors 114 detect that an object is not placed while the object is being held (ranging: long range), it can be assumed that the object has fallen. That is, a fall of an object can also be detected.

Figure 3A:
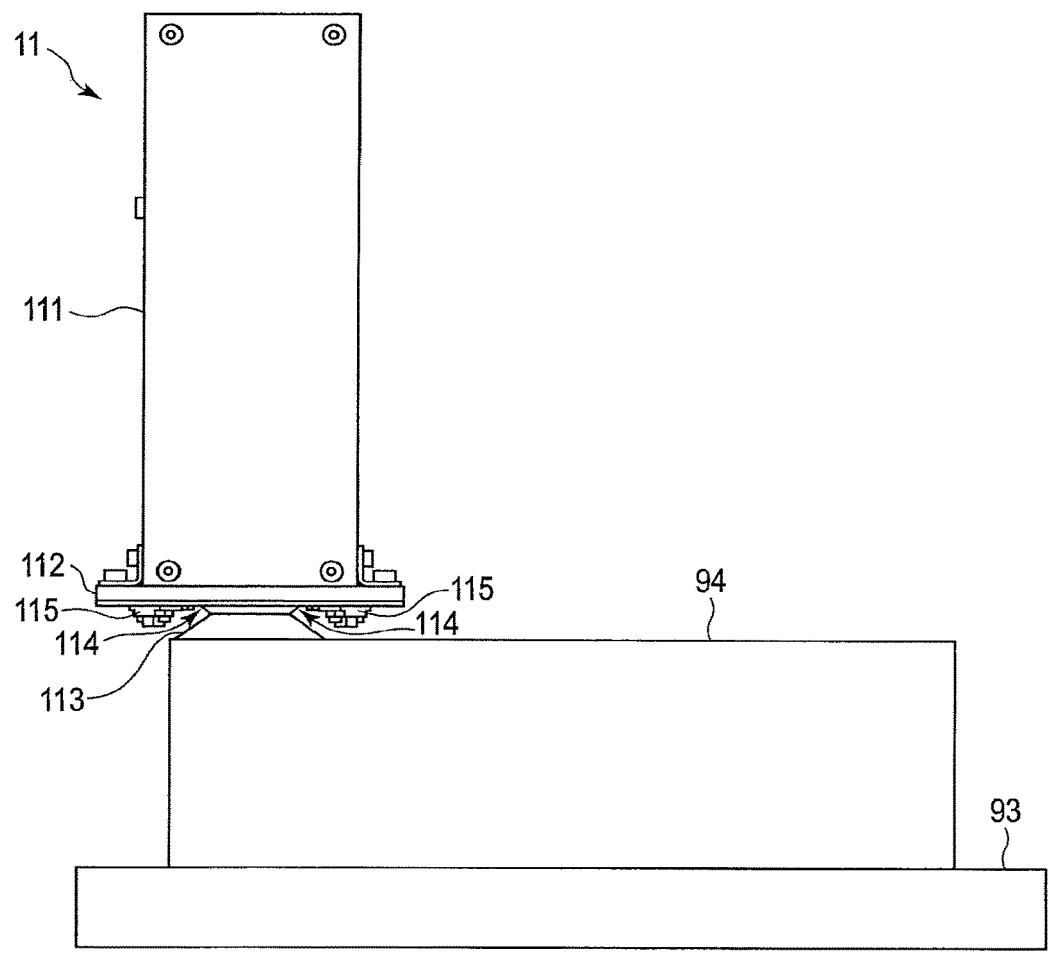
FIGS. 3A and 3B are a side view and a bottom view illustrating an example of using a proximal sensor shown in FIG. 2A.
Figure 3B:
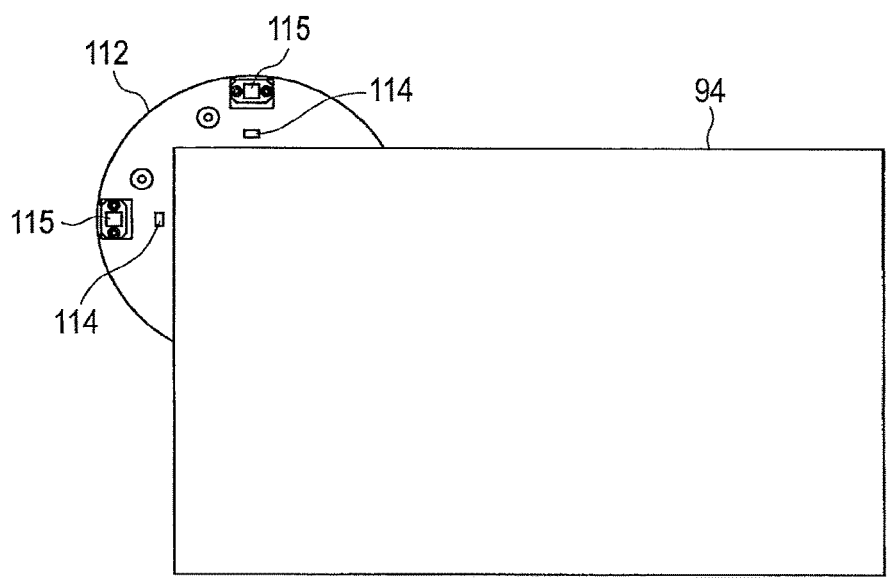

Furthermore, in the handling robot system 1, contour information of an object to be transferred is acquired by image recognition processing, etc. Accordingly, the robot controller 20 can predict a proximal sensor assumed to detect an object (ranging: proximal range) based on the contour information. For example, as shown in FIG. 3A, it is assumed that an object 94 loaded on a loading board 93 is held. As shown in FIG. 3B, a top surface of the object 94 is sufficiently broader than the suction surface of the suction pad 113. Thus, if the object holding apparatus 11 holds the object 94 at a suitable position, all the proximal sensors 114 are assumed to detect the object 94. However, in the state shown in FIG. 3B, the object 94 is not detected by two proximal sensors 114. Based on this, it is possible to redo the holding operation. Otherwise, in the case where the proximal sensors that actually detect an object when holding the object and the predicted proximal sensors are different, it may be assumed that a wrong object (an object different from the object to be transferred) is held. That is, it is possible to detect that a wrong object is held. For example, in the case where a thin object is to be held, it is predicted that only a pair of facing proximal sensors 114 react. However, if all the proximal sensors 114 react, it indicates a possibility of holding a wrong object.

The suction pad 113 having a bellows shape contracts when holding an object. Accordingly, in the case where the flight device 10 declines, and the distance between the proximal sensors 114 and the top surface of the object becomes smaller than a predetermined distance, it is possible to determine that the suction pad 113 successfully adheres to the object. In the case where the contact sensors 115 are brought into contact with the top surface of the object, it is also possible to determine that the suction pad 113 suctions the object. The contact sensors 115 reliably detect an object that light penetrates and cannot be detected by the proximal sensors 114.

In the handling robot system 1, distance information indicating a distance from the flight device 10 to the top surface of an object placed at the highest position is acquired by image recognition processing, and the flight device 10 is controlled to descend based on the distance information. However, if the distance information includes an error detection, especially, in the case where a distance greater than an actual distance is detected, the object holding apparatus 11 (in particular, the suction pad 113) of the flight device 10 may over-press the object, thereby causing damage or deformation of the object.

By providing the proximal sensors 114 and the contact sensors 115 having the aforementioned configurations on the periphery of the suction pad 113 on the sensor-mounting member 112, the descent of the flight device 10 can be stopped before the sensor-mounting member 112 approaches the object. Accordingly, it can be prevented to damage or deform the object due to over-pressing by the object holding apparatus 11. Since the pressing of the object is performed uniformly by the entire suction pad 113 of the object holding apparatus 11, it is sufficient that at least one of proximal sensor 114 or contact sensor 115 provided on the sensor-mounting member 112 is used. Thus, if at least one proximal sensor 114 or contact sensor 115 is arranged along the contour of the sensor-mounting member 112, over-pressing can be prevented with an absolute minimal number of sensors.

In addition, the proximal sensor 114 or the contact sensor 115 can be used for checking whether or not the object to be suctioned by the suction pad 113 is over-sized. Furthermore, in the case where an obstacle is placed on a moving path of the object holding apparatus 11 when the object holding apparatus 11 is moving downward or horizontally, the proximal sensor 114 or the contact sensor 115 can detect the obstacle before the object holding apparatus 11 collides with the obstacle, and accordingly, a collision between the flight device 10 and the obstacle can be prevented.

Figure 4:
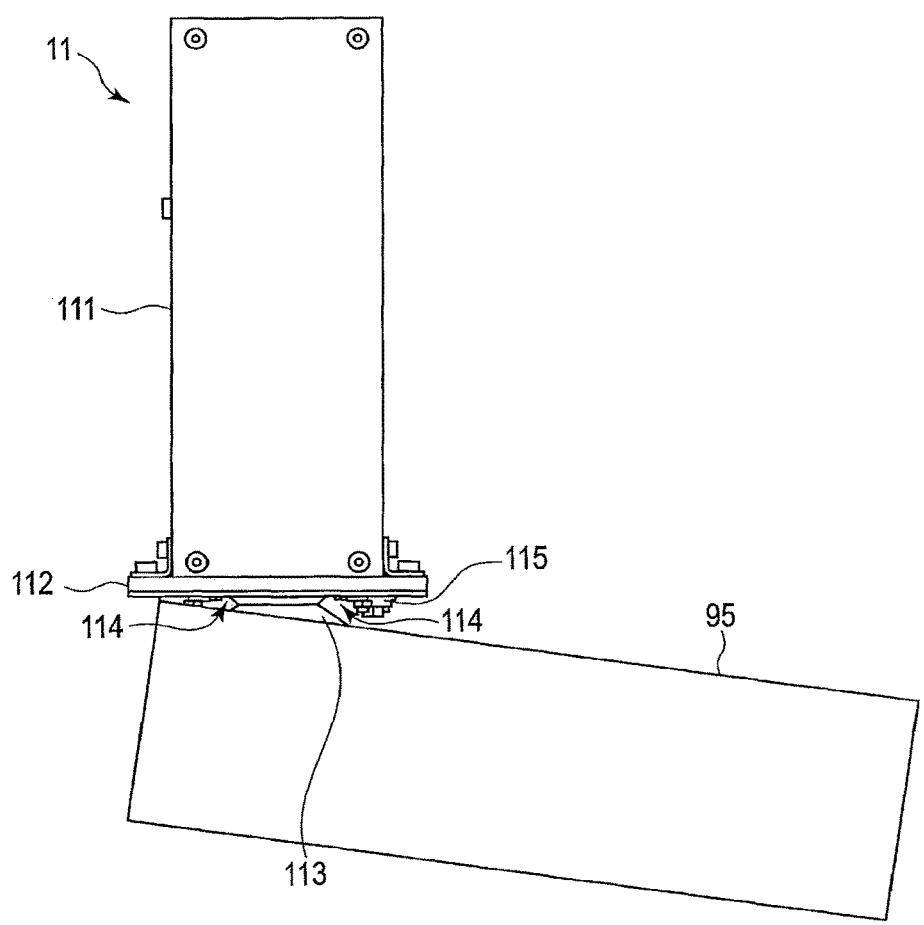
FIG. 4 illustrates an example of using a proximal sensor shown in FIG. 2A.

FIG. 4 shows an example of utilizing the proximal sensor 114. As shown in FIG. 4, there is a case where an object 95 held by the object holding apparatus 11 is inclined due to the center of gravity of the object 95. Since the positional arrangement of the proximal sensors 114 is geometrically predetermined, the degree of inclination can be calculated based on the distance measured by the proximal sensors 114. The center of gravity of the object 95 can also be calculated based on the ranging result. Accordingly, the object 95 can again be stably held by holding the object 95 based on the calculated center of gravity. It is desirable to densely provide multiple proximal sensors 114 in order to detect the inclination of the object 95; however, it may be sufficient to provide at least two proximal sensors 114.

In the present embodiment, a plurality of proximal sensors 114 are provided on the sensor-mounting member 112. With this configuration, in the case where image recognition is not successfully performed by the recognition device 30, the suction pad 113 holds and lifts the object, and the contour information (dimension, shape) and inclination of the object can be recognized based on the detection results of the plurality of proximal sensors in the state where the object is lifted. As a result, a suitable holding manner by the suction pad 113 can be set based on the recognized contour information and inclination of the object, and the object can again be held in the set holding manner. Therefore, even in case where an error recognition of an object to be transferred occurs, the transfer operation can be continuously performed without stopping the operation due to a fall of the object or an error.

FIG. 5 shows a control system of the object holding apparatus 11. The object holding apparatus 11 further includes a controller 50, a suction device 52, a directional control valve 53, a pressure sensor 54, a power supply 55, a DC-to-DC converter 56, a directional control valve driver circuit 57, and a suction device driver circuit 58. These elements are housed inside of the housing 111.

The suction device 52 is connected to the suction pad 113 through a tube 51. The pressure sensor 54 is connected to the tube 51. The directional control valve 53 is connected to the suction device 52 through the tube 51. The tube 51 connected to the suction pad 113 and the tube 51 connected to the directional control valve 53 are joined and connected to the suction device 52. The tube 51 connected to the suction pad 113 and the tube 51 connected to the directional control valve 53 may be communicated in the suction device 52. The tube 51 has a flow path through which fluid may flow. The fluid is gas such as air.

The controller 50 controls the directional control valve 53 and the suction device 52. Specifically, the controller 50 transmits to the directional control valve driver circuit 57 a driving instruction which selectively instructs driving or stopping of the directional control valve 53. Similarly, the controller 50 transmits to the suction device driver circuit 58 a driving instruction which selectively instructs driving or stopping of the suction device 52.

When fluid is supplied from the atmosphere to the flow path, the controller 50 opens the directional control valve 53 to communicate the inside of the tube 51 with the atmosphere. When the suction pad 113 suctions the fluid, the controller 50 closes the directional control valve 53. In this state, the suction device 52 suctions fluid from the suction pad 113 through the tube 51. The suction device 52 may adopt a vacuum pump, for example. A suction device in which a pressure device and a vacuum generator are combined, and which generates negative pressure, may be used instead of the vacuum pump. In consideration of the configuration that the object holding apparatus 11 is mounted on the flight device 10, the suction device 52 is desirably a small size. It is desirable that the tube 51 is not crushed due to suction by the suction device 52.

The pressure sensor 54 detects a pressure in the tube 51. The controller 50 determines whether or not to continue suction by the suction device 52, based on the pressure detected by the pressure sensor 54. In addition, the controller 50 determines whether or not the object is successfully held, based on the pressure detected by the pressure sensor 54. A flow-rate sensor may be provided instead of, or in addition to the pressure sensor 54. It may be possible that the flow-rate sensor detects the flow-rate of fluid inside of the tube 51, and the controller 50 determines whether or not to continue suction by the suction device 52, based on the flow-rate detected by the flow-rate sensor. The suction pad 113 is desirably deformed when suctioning an object. The suction pad 113 has, for example, a bellows shape. The suction pad 113 adheres to the top surface of an object to hold the object. The controller 50 may transmit to a higher-layer controller 70 a sensor signal from the pressure sensor 54 and/or information that indicates a driving state of the directional control valve by wiring or wireless. The higher-layer controller 70 includes, for example, a robot controller 20 and/or a controller within the flight device 10. The object holding apparatus 11 may be used as an IoT (Internet of Things) device.

The power supply 55 is, for example, a rechargeable battery. The power supply 55 supplies power to the controller 50, the pressure sensor 54, the directional control valve driver circuit 57, and the suction device driver circuit 58. The DC-to-DC converter 56 converts the voltage level of power supplied from the power supply 55. The pressure sensor 54, the directional control valve driver circuit 57, and the suction device driver circuit 58 receive power supplied from the power supply 55 through the DC-to-DC converter 56.

Figure 6:
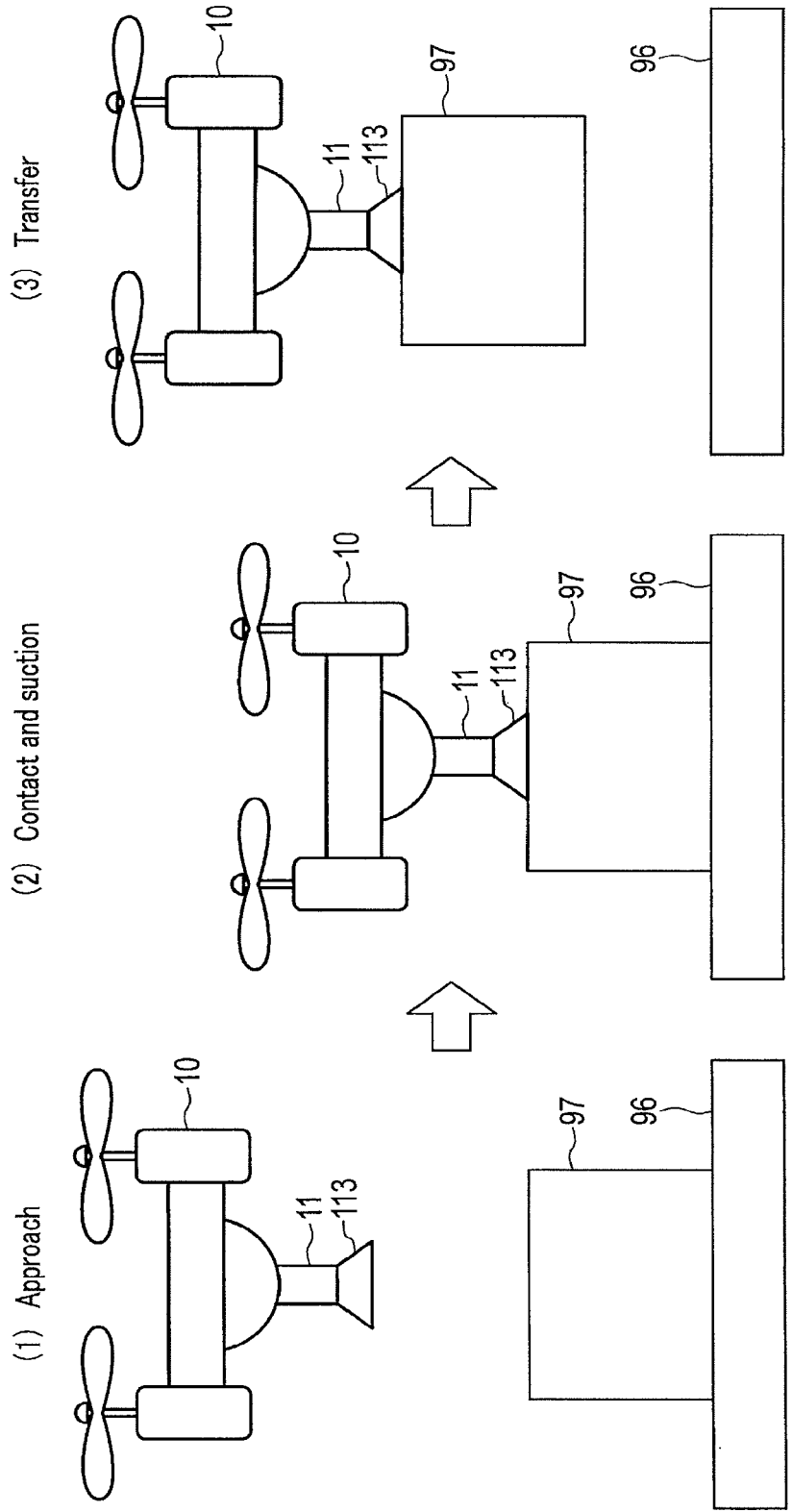
FIG. 6 illustrates an operation example of the object holding apparatus shown in FIG. 1.

An operation example of the object holding apparatus 11 will be explained with reference to FIG. 6. In FIG. 6, an object 97 is an object to be transferred, and is loaded on a loading board 96.

(1) Approach

The flight device 10 moves toward the object 97. Specifically, the flight device 10 moves to the above the object 97, and then descends. If the proximal sensors 114 of the object holding apparatus 11 detect that the object 97 is in close proximity, the controller 50 drives the suction device 52 in advance and starts evacuation of air inside of the suction pad 113, in order to swiftly adhere to the object 97. In this case, the controller 50 drives the suction device 52 if the distance to the object 97 measured by the proximal sensors 114 becomes less than a distance threshold. The distance threshold is, for example, set so that the suction device 52 is started to be driven immediately before the object 97 is in contact with the suction surface of the suction pad 113. The distance threshold may be fixed or variable. For example, the distance threshold is adjusted in accordance with the moving speed of the flight device 10, namely, the moving speed of the suction pad 113. Specifically, the distance threshold is set to be long in the case where the moving speed of the flight device 10 is high, and to be short in the case where the moving speed of the flight device 10 is low. The distance threshold may be adjusted continuously or step-by-step in accordance with the moving speed. The moving speed of the flight device 10 may be acquired from the higher-layer controller 70, or calculated based on a sensor signal output from an acceleration sensor provided within the object holding apparatus 11, as explained in the fourth embodiment.

(2) Contact and Suction

The controller 50 detects a contact of the object 97 to the suction pad 113 based on a sensor signal from the proximal sensors 114 or the contact sensors 115, continues suction operation, and monitors the pressure. The controller 50 may stop driving of the suction device 52 in the case where the pressure becomes lower than a pressure threshold (the predetermined vacuum level). This control leads to power saving, and realizes saving the battery of the power supply 55. In the case where an impermeable object is suctioned, a duration in which the vacuum level of the suction pad 113 is maintained is long even if driving of the suction device 52 is stopped. However, in the case where a permeable object is suctioned, a duration in which the vacuum level of the suction pad 113 is maintained becomes short due to air entering to the suction pad 113 if driving of the suction device 52 is stopped. Accordingly, the controller 50 drives the suction device 52 intermittently while monitoring the pressure.

(3) Transfer

The controller 50 controls movement of the flight device 10 to transfer the object 97 while monitoring the vacuum level and intermittently driving the suction device 52. For example, the flight device 10 ascends and then moves in the horizontal direction. The controller 50 transmits to the higher-layer controller 70 information including a sensor signal output from the proximal sensors 114, the contact sensors 115, and the pressure sensor 54, if required. The higher-layer controller 70 confirms the holding state based on the information received from the object holding apparatus 11. The higher-layer controller 70 performs schedule management of the entire transfer operation, or operation control of the flight device 10.

(4) Release

In the case where the flight device 10 transfers the object 97 to a destination (for example, the conveyor 40 shown in FIG. 1), the controller 50 opens the directional control valve 53 to communicate the suction pad 113 with the atmosphere. By this operation, the vacuum within the suction pad 113 is released, and the object 97 is released from the suction pad 113. The suction device 52 is stopped at this time.

In the object holding apparatus 11, the suction device 52 is driven in response to detection of approach of an object to the suction pad 113, and accordingly, the power consumption of the power supply 55 can be suppressed. This leads to improvement of the operating time of the flight device 10. The power supply 55 may be shared with the flight device 10, or be provided to be dedicated to the object holding apparatus 11. The operation state of the suction device 52 is switched based on the vacuum level (pressure value) of the suction pad 113 when transferring the object. This also leads to suppressing the power consumption of the power supply 55.

The transfer operation by the flight device 10 will be explained with reference to FIGS. 7A and 7B.

Figure 7A:
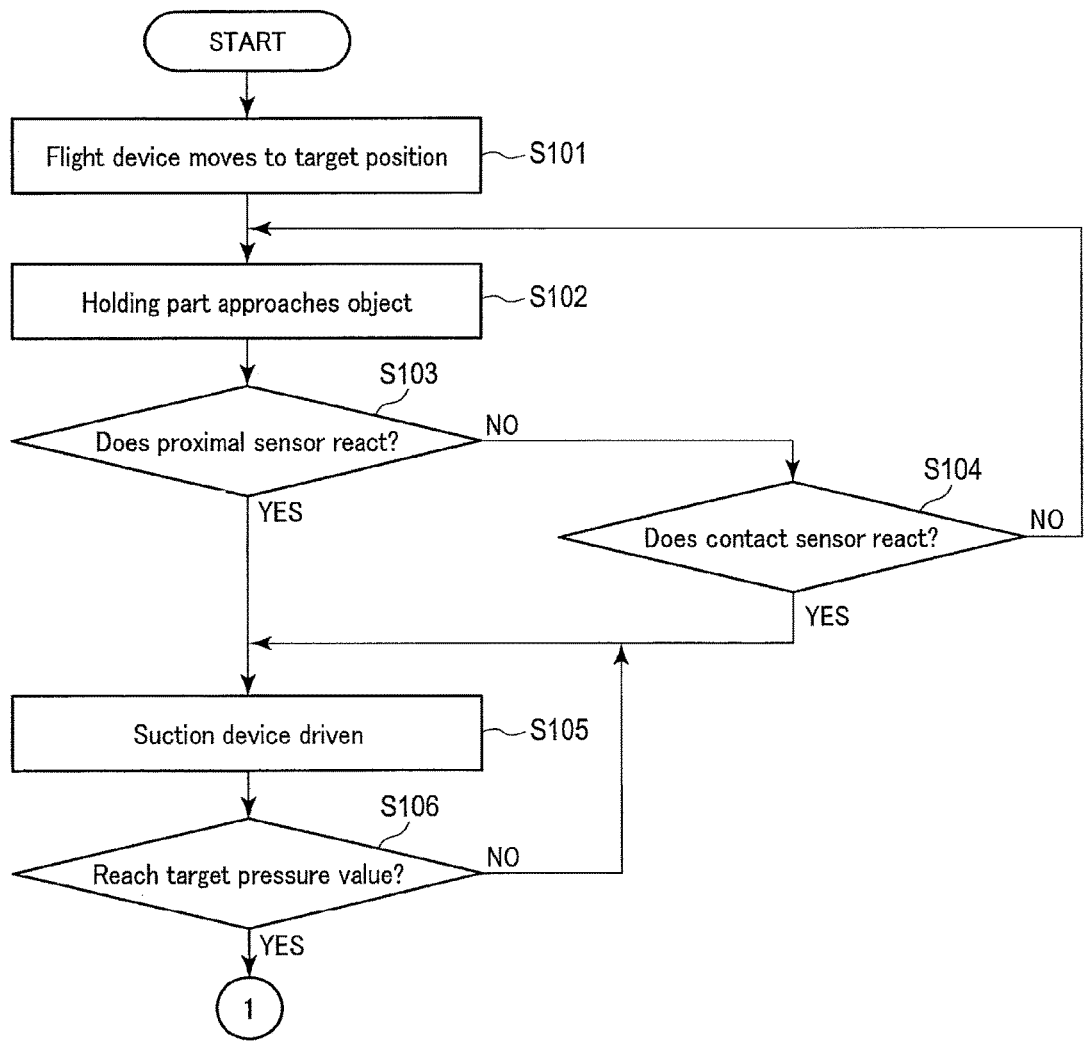
FIGS. 7A and 7B are a series of flowcharts illustrating an operation from approach to an object to holding the object by a flight device shown in FIG. 1.

FIG. 7A shows an operation flow of the flight device 10 from approaching to an object to holding the object. In step S101 of FIG. 7A, the flight device 10 moves to a target position under control of the robot controller 20. The robot controller 20 controls movement of the flight device 10 based on the position orientation information of an object generated by the recognition device 30. An operator may visually check the object and input the position orientation information of the object.

In step S102, the flight device 10 approaches the object so that the suction pad 113 of the object holding apparatus 11 is brought in close proximity to the object. In step S103, the controller 50 determines whether or not the proximal sensors 114 react. Specifically, the controller 50 determines whether or not the distance to the object becomes equal to or less than the distance threshold, based on a sensor signal from the proximal sensors 114. In the case where the proximal sensors 114 do not react, the processing proceeds to step S104, and the controller 50 determines whether or not the contact sensors 115 react. Specifically, the controller 50 determines whether or not the object is in contact with the contact sensors 115, based on a sensor signal from the contact sensors 115. In the case where none of the proximal sensors 114 and the contact sensors 115 react, the processing, returns to step S102, and the flight device 10 approaches closer to the object.

If the proximal sensors 114 or the contact sensors 115 react, the processing proceeds to step S105. In step S105, the controller 50 drives the suction device 52. In step S106, the controller 50 determines whether or not the vacuum level of the suction pad 113 reaches a target pressure value. If the vacuum level of the suction pad 113 reaches the target pressure value, the flight device 10 starts transfer of the object under control of the robot controller 20.

In the present embodiment, even in the case where the proximal sensors 114 cannot detect that an object is in close proximity, the contact sensors 115 detect the object. Accordingly, the object holding operation can be reliably performed.

Figure 7B:
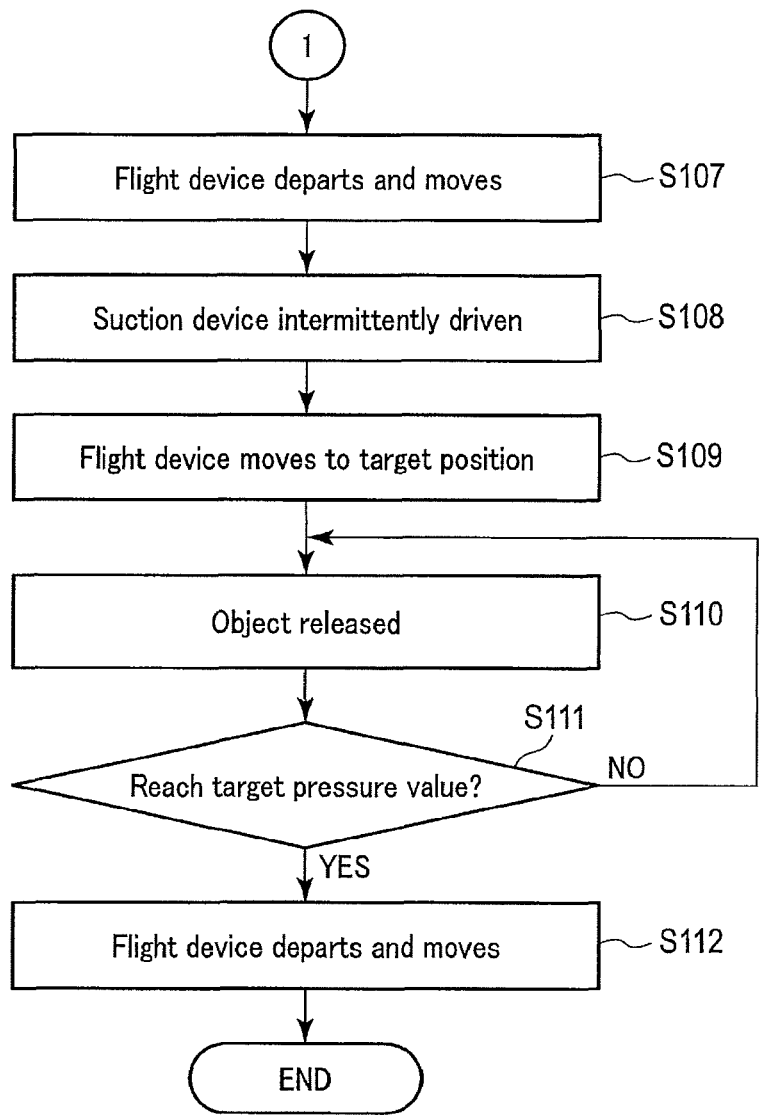

FIG. 7B shows an operation flow of the flight device 10 from transfer of an object to release of the object. In step S107 of FIG. 7B, the flight device 10 departs and moves under control of the robot controller 20. In step S108, the controller 50 intermittently drives the suction device 52. By this operation, the vacuum level of the suction pad 113 is maintained to be equal to or greater than the target pressure value. In step S109, the flight device 10 moves to the target position. In step S110, release operation of the object is performed. For example, the controller 50 controls the suction device 52 to stop, and opens the directional control valve 53. If the robot controller 20 confirms that the vacuum level of the suction pad 113 decreases to a target pressure value in step S111, the robot controller 20 moves the flight device 10 in step S112. Whether or not the object is released may be determined based on a sensor signal from the proximal sensors 114 or the contact sensors 115 in addition to a sensor signal from the pressure sensor 54. In this case, the reliably of the release operation is further improved.

FIG. 8 shows the detailed configuration of the controller 50 shown in FIG. 5. As shown in FIG. 8, the controller 50 includes a command generator 501, an operation mode storage unit 502, a target value generator 503, a drive controller 504, a determination unit 505, and a signal processor 506. The controller 50 is also referred to as a control unit 50. A driver 510 includes the directional control valve driver circuit 57 and the suction device driver circuit 58 as shown in FIG. 5.

An input part 60 inputs an operation instruction to the command generator 501. The command generator 501 generates an operation command which indicates an operation procedure required in each operation process, in accordance with the operation instruction. The command generator 501 transmits to the operation mode storage unit 502 operation mode information according to the operation command to be executed. The operation mode storage unit 502 stores the operation mode information. The operation mode storage unit 502 further stores attribution data such as a shape, weight, flexibility of an object to be transferred. The operation mode includes, for example, an operation to drive the directional control valve 53, an operation to stop driving of the directional control valve 53, an operation to drive the suction device 52, and an operation to stop driving of the suction device 52, etc.

The operation instruction from the input part 60 is an instruction relating to a series of operations of the object holding apparatus 11, and is stored in the controller 50 in the form of a program, for example. The operation instruction may be generated by the operator touching an instruction command displayed on a panel by the input part 60, or generated by a voice of the operator. The input part 60 may be integrally formed with the flight device 10, or may transmit an instruction to the flight device 10 by wiring or wireless.

The target value generator 503 receives an operation command to the directional control valve 53 or the suction device 52 from the command generator 501. The target value generator 503 calculates a target value of the directional control valve 53 or the suction device 52, and generates a target instruction value relating to driving of the directional control valve 53 or the suction device 52.

The drive controller 504 receives the target instruction value of the directional control valve 53 or the suction device 52 from the target value generator 503, and generates a drive instruction to drive the directional control valve 53 or the suction device 52 in accordance with the target instruction value.

The driver 510 receives the drive instruction of the directional control valve 53 or the suction device 52 from the drive controller 504, and generates a drive output of the directional control valve 53 or the suction device 52. The directional control valve 53 receives the drive output from the driver 510, and adjusts an amount or properties (communication with the negative pressure side, communication with the atmosphere pressure) of fluid to be supplied. The directional control valve 53 may adopt, for example, a combination of an electromagnet solenoid and a flow path blocking plate member, or a combination of an electromagnet rotary motor and a flow path blocking plate member.

The suction device 52 receives the drive output from the driver 510, and initiates or stops suction in accordance with the drive output.

The pressure sensor 54 senses a suction operation of the suction pad 113, and generates a sensor signal. The sensor signal is, for example, a voltage signal. The proximal sensors 114 sense an approach operation of the object holding apparatus 11 and an object, and generate a sensor signal. The sensor signal is, for example, a voltage signal. The contact sensors 115 sense a contact operation of the object holding apparatus 11 and an object, and generate a sensor signal. The sensor signal is, for example, a voltage signal.

The signal processor 506 receives a sensor signal from the pressure sensor 54, the proximal sensors 114, and the contact sensors 115, and performs signal processing including signal amplification and analog-to-digital conversion to the sensor signal.

The determination unit 505 receives the converted sensor signal from the signal processor 507. The determination unit 505 adjusts fluid supply and determines whether or not an object is held, in accordance with the sensor signal. The determination unit 505 receives the operation mode information from the command generator 501 in accordance with a determination result. The determination unit 505 extracts an operation of the directional control valve 53 corresponding to the operation mode information from the operation mode storage unit 502. The determination unit. 505 generates a command for stopping drive of the directional control valve 53 or switching the directional control valve 53, etc. The determination unit 505 generates a return value command to correct the target value relative to the command generator 501. In response to the return value command, the command generator 501 can perform a corresponding processing suitable for the current operation, and realize reliability and certainty of the operation of the object holding apparatus 11.

A part of or all of the aforementioned functions of the controller 50 can be implemented by the robot controller 20, or a controller within the flight device 10.

As stated above, the object holding apparatus 11 according to the present embodiment is componentized with the suction device 52, the power supply 55, etc. Accordingly, the object holding apparatus 11 can be easily attached to the flight device. In addition, the object holding apparatus 11 includes the proximal sensors 114, and autonomously initiates the suction operation immediately before the holding part are in contact with an object, based on the sensor signal from the proximal sensors 114. This configuration realizes power saving. Furthermore, the vacuum system becoming unexpectedly clogged with dust is suppressed, and durability can be improved.

Second Embodiment

Figure 9B:
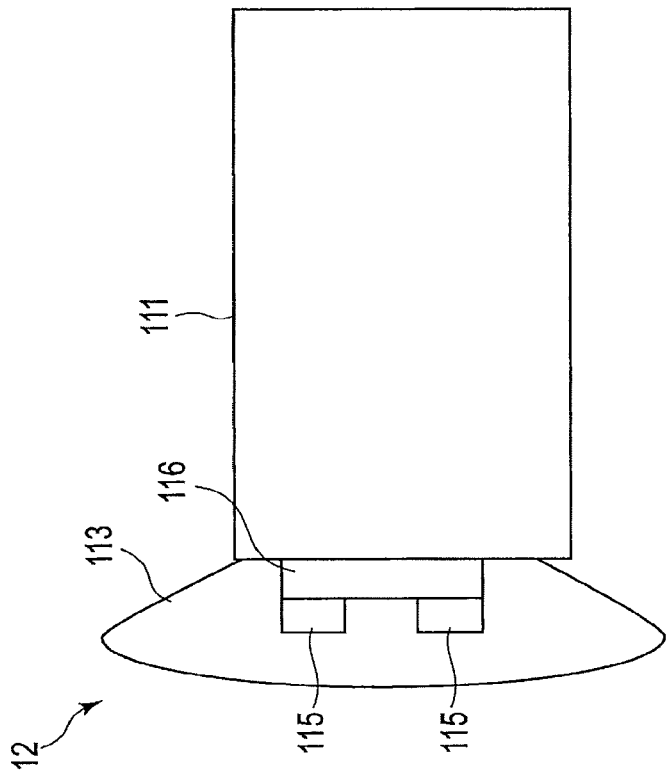
FIGS. 9A and 9B are a front view and a side view illustrating external appearances of an object holding apparatus according to the second embodiment.
Figure 9A:
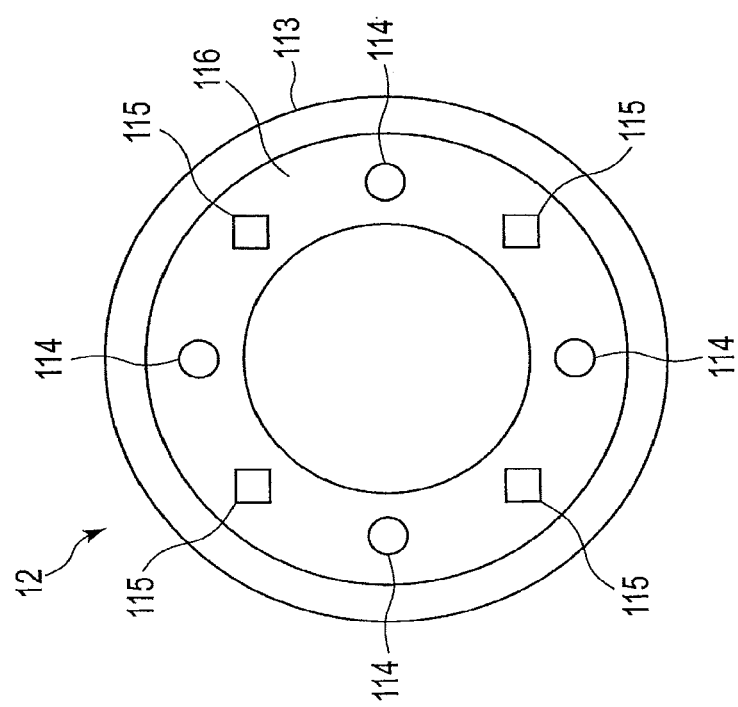

FIGS. 9A and 9B respectively are a front view and a side view of the external appearance of an object holding apparatus 12 according to the second embodiment. FIG. 9B shows a perspective view of the suction pad 113 to visualize the arrangement of sensors. As shown in FIGS. 9A and 9B, the proximal sensors 114 and the contact sensors 115 are arranged inside of the suction pad 113. In other words, the proximal sensors 114 and the contact sensors 115 are arranged within a tightly closed space between the suction pad 113 and an object. The proximal sensors 114 and the contact sensors 115 are mounted on a sensor-mounting member 116, and fixed to the housing 111 via the sensor-mounting member 116. The sensor-mounting member 116 has, for example, a ring shape. The proximal sensors 114 and the contact sensors 115 are arranged alternately, and are separated from each other by 45 degrees on the circumference.

As stated above, in the second embodiment, the proximal sensors 114 and the contact sensors 115 are arranged inside of the suction pad 113. This structure realizes downsizing of the object holding apparatus. As a result, it is expected to reduce a risk of the object holding apparatus being in contact with the ambient environment. However, the detection of an obstacle in the periphery or the detection of suction range is difficult in comparison with the case where the proximal sensors 114 and the contact sensors 115 are arranged on the outer periphery of the suction pad 113, as in the first embodiment.

Modification of First or Second Embodiment

Figure 10:
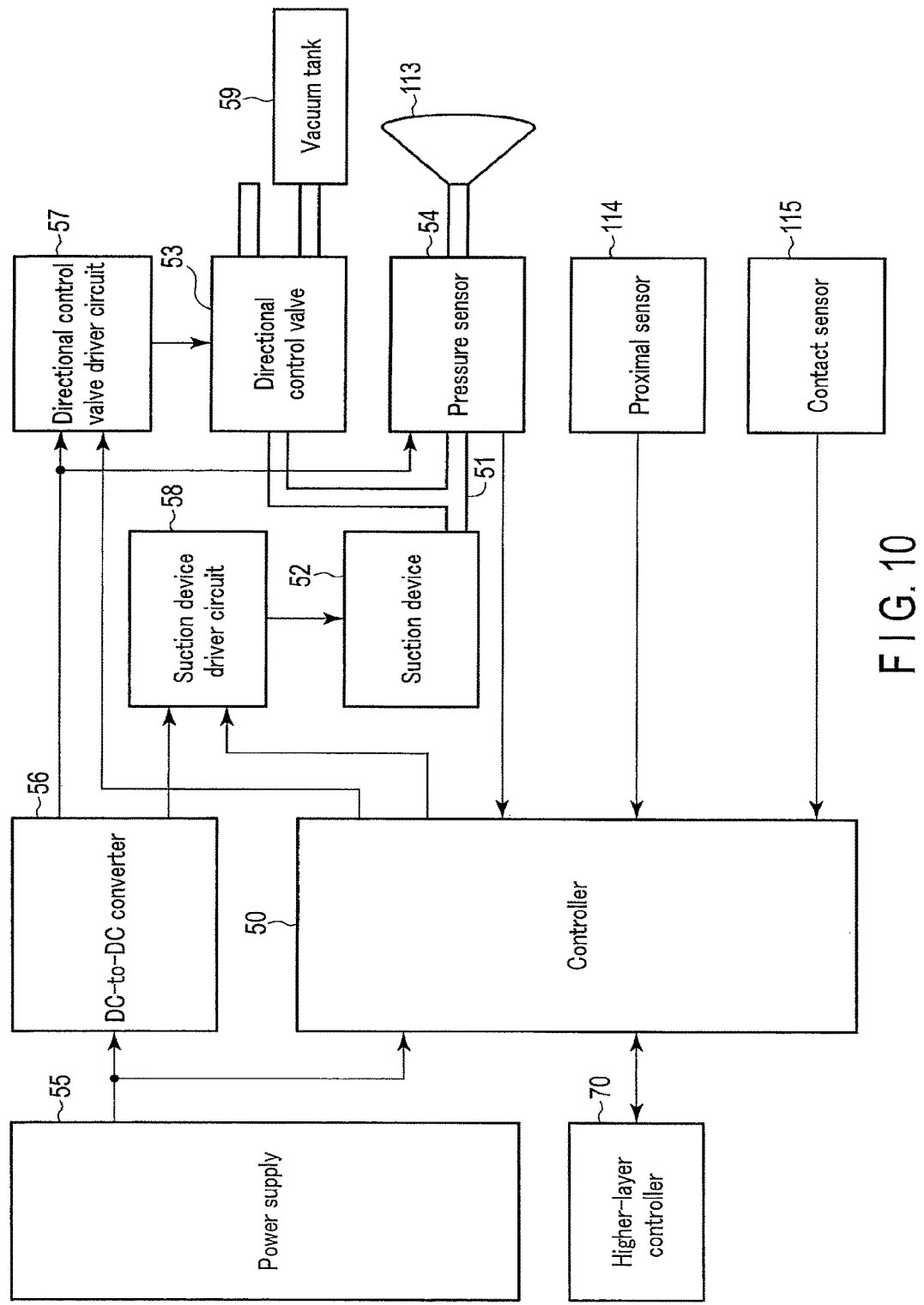
FIG. 10 is a block diagram illustrating an object holding apparatus according to a modification of the first embodiment or the second embodiment.

FIG. 10 shows an object holding apparatus according to the modification of the first embodiment. As shown in FIG. 10, in the modification of the first embodiment, a vacuum tank 59 is connected to the directional control valve 53 through a tube. When the suction pad 113 does not adhere to an object, the suction device 52 is communicated with the vacuum tank 59, and a vacuum inside of the vacuum tank 59 is released in advance. Accordingly, the vacuum tank 59 maintains a high vacuum level. The directional control valve 53 generates three states: a state of closing the valve (i.e., a state where communication between the flow path connecting the suction device 52 and the suction pad 113 and the atmosphere is blocked); a state of communicating the suction pad 113 with the atmosphere (i.e., a state where communication between the flow path and the atmosphere is allowed); and a state of communicating the suction pad 113 with the vacuum tank 59 (i.e., a state where communication between the flow path and the vacuum tank 59 is allowed).

The operation of the object holding apparatus will be explained.

(1) Approach

If the controller 50 detects that an object is in close proximity to the suction pad 113, the controller 50 allows communication between the vacuum tank 59 and the suction pad 113 in order to swiftly suction the object.

(2) Contact and Suction

If the controller 50 detects a contact with an object, the controller 50 drives the suction device 52, and monitors the pressure. In addition, the controller 50 drives the directional control valve 53 to switch from the state of connecting the suction pad 113 and the vacuum tank 59 to the state of connecting the suction pad 113 and the suction device 52. Specifically, the controller 50 closes the valve of the directional control valve 53. Accordingly, it is possible to generate a stable suction state.

(3) Transfer

The controller 50 monitors the vacuum level and intermittently drives the suction device 52, and the robot controller 20 controls the flight device 10 to transfer an object. The controller 50 transmits data to the higher-layer controller 70 if necessary.

(4) Release

The controller 50 monitors the vacuum level, drives the directional control valve 53, and allows the suction pad 113 to communicate with the atmosphere. In addition, the controller 50 stops driving of the suction device 52. The vacuum tank 59 may be provided for each object holding apparatus, or may be shared by a plurality of object holding apparatuses.

Figure 11:
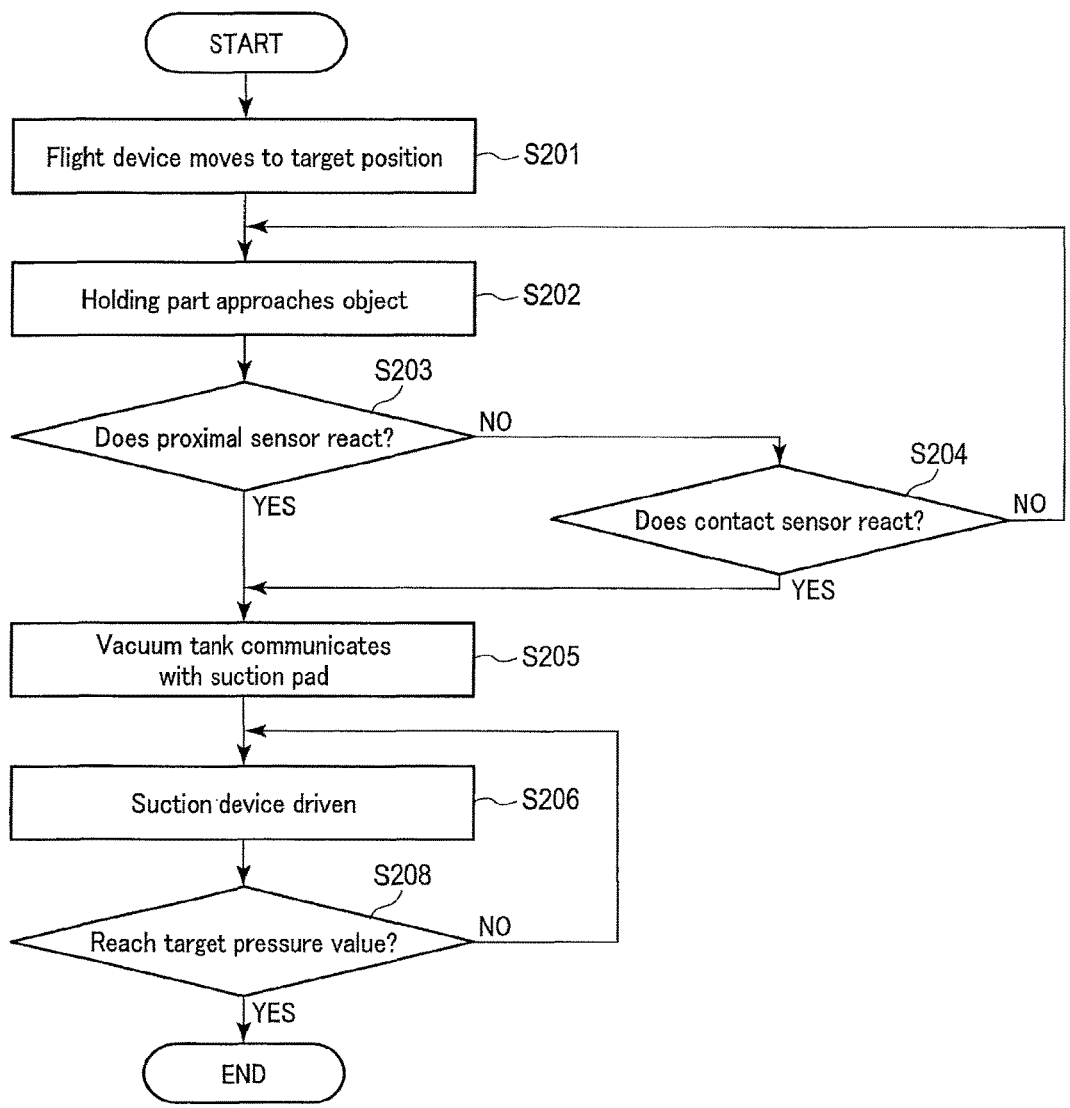
FIG. 11 is a flowchart illustrating an operation from approach to an object to holding the object by a flight device including an object holding apparatus shown in FIG. 10.

FIG. 11 shows an operation flow of the flight device 10 in which the object holding apparatus that includes the vacuum tank 59 is mounted from approaching an object to holding the object. Step S201 to S204 and S207 shown in FIG. 11 are the same as step S101 to S104 and S106 shown in FIG. 7A. Accordingly, explanations thereof will be omitted.

In the case where the proximal sensors 114 and the contact sensors 115 react, the controller 50 drives the directional control valve 53 to allow the suction pad 113 to communicate with the vacuum tank 59 (step S205). Next, if the controller 50 detects a contact with an object, the controller 50 drives the suction device 52 (step S206). In addition, the controller 50 drives the directional control valve 53, and switches from the state where the suction pad 113 is communicated with the vacuum tank 59 to the state where the valve is closed.

As stated above, the object holding apparatus according to the modification of the first embodiment includes the vacuum tank 59 connected to the suction pad 113. The vacuum tank 59 is maintained to be a vacuum or at a low pressure, and when the suction pad 113 suctions an object, the valve is switched to allow the suction pad 113 to communicate with the vacuum tank 59, so that the pressure inside of the suction pad 113 can be abruptly lowered. As a result, a suction operation can be swiftly performed.

The mechanism according to the above modification can be applied to the second embodiment.

Third Embodiment

FIG. 12 shows an object holding apparatus according to the third embodiment. As shown in FIG. 12, a multiplex circuit 62 is provided between the controller 50 and the proximal sensors 114 and/or the contact sensors 115. In the example of FIG. 12, one proximal sensor 114 and one contact sensor 115 are provided. A plurality of proximal sensors 114 and a plurality of contact sensors 115 may be provided.

The multiplex circuit 62 multiplexes a sensor signal (analog signal) output from the proximal sensor 114 and the contact sensor 115. Specifically, the multiplex circuit 62 combines a plurality of sensor signals to be one signal in a manner so as to be divided later. For example, the multiplex circuit 62 switches a sensor signal by dividing time.

As the number of the proximal sensors 114 or the contact sensors 115 increases, the number of wirings increases proportionally. Providing the multiplex circuit 62 reduces wiring, and suppresses an increase of connection ports of the controller 50.

Fourth Embodiment

Figure 13:
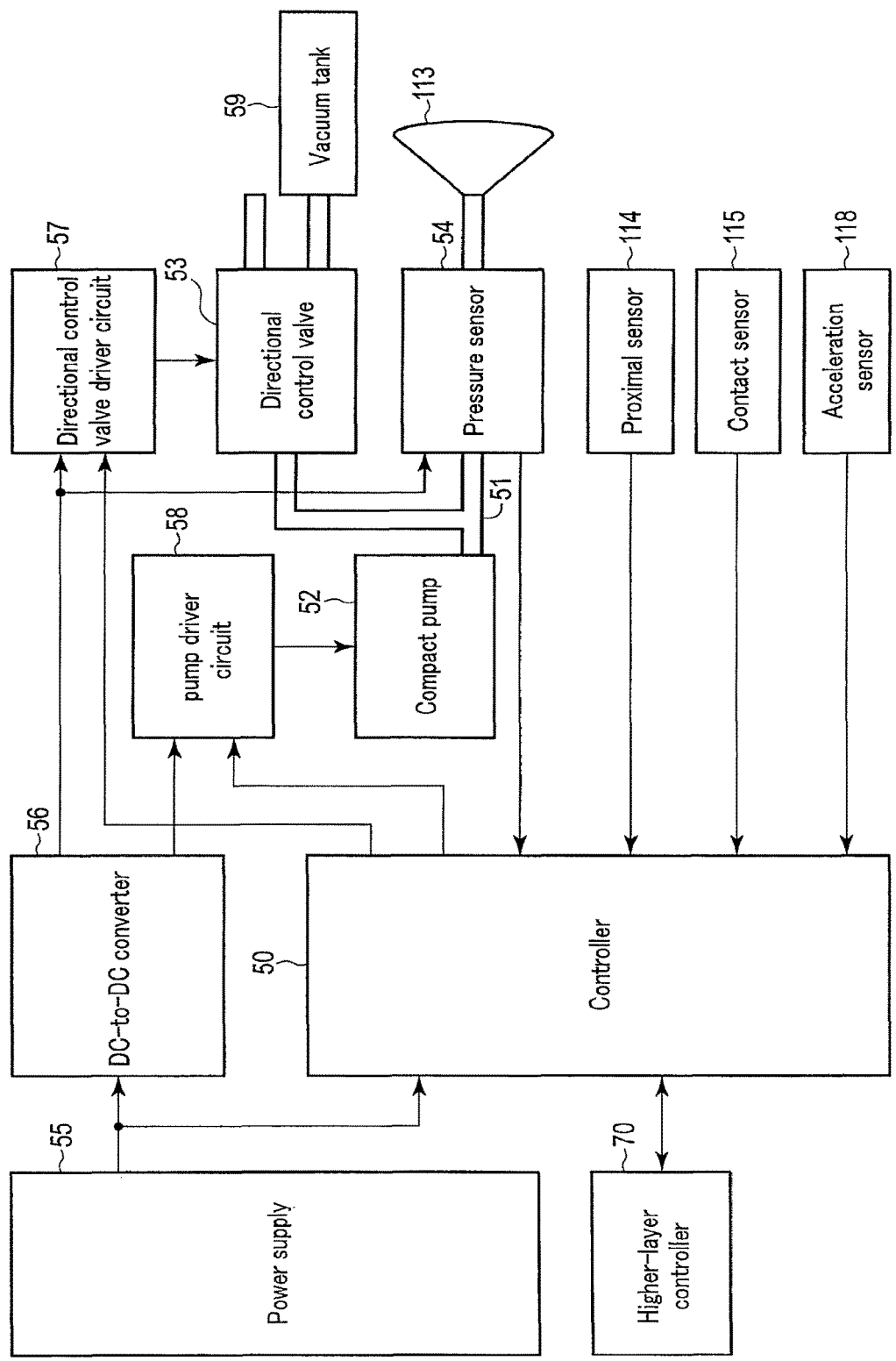
FIG. 13 is a block diagram showing an object holding apparatus according to the fourth embodiment.

FIG. 13 shows an object holding apparatus according to the fourth embodiment. In the object holding apparatus shown in FIG. 13, an acceleration sensor 118 is connected to the controller 50. The acceleration sensor 118 is an inertial sensor for measuring an acceleration. The acceleration sensor 118 is capable of detecting a direct current (DC) acceleration, thereby detecting the gravitation, which is different from the vibration sensor. By performing suitable signal processing to an acceleration signal that indicates an acceleration measured by the acceleration sensor 118, various information such as an inclination, a motion, a vibration, or an impact can be obtained. Accordingly, the moving speed or the acceleration state of the flight device 10 can be monitored, and accordingly, the timing for driving the suction device 52 is adjustable in accordance with the speed of the flight device 10. Specifically, a threshold relative to the proximal sensors 114 or the contact sensors 115 is changed in accordance with the acceleration state, and the timing for driving the suction device 52 is adjusted. For example, in the case where the flight device 10 is flying at high speed, a threshold (distance threshold) for detecting that an object is in close proximity is set to be long so that the suction device 52 can be driven immediately before the object is in contact with the suction pad 113.

As stated in each of the aforementioned embodiments, in the case where the object holding apparatus is formed as a component, reduced wiring of sensors is realized, and a reduction of time required for suction operation is realized since the tube piping length is shortened. The suction device 52 needs to suction gas from the inside of the entire tube in addition or the inside of the suction pad 113. If the tube piping length is short, the volume required for suction becomes small, and accordingly the time required for suction operation can be reduced.

The flight device is an example of a robot capable of adopting the object holding apparatus. The object holding apparatus according to each of the aforementioned embodiments can be applied to a manipulator or a mobile cart.

In each embodiment, it is assumed that the processing in the controller 50 is implemented by program software in an external storage such as a memory by using a CPU (Central Processing Unit); however, the processing may be implemented by a single electronic circuit (hardware) without using a CPU. In addition, the processing may be implemented through a cloud server.

The instructions included in the steps described in the foregoing embodiments can be implemented based on a software program. A general-purpose computer system may store the program beforehand and read the program in order to attain the same effects as the above-described processing. The instructions described in the above embodiments are stored in a magnetic disc (flexible disc, hard disc, etc.), an optical disc (CD-ROM, CD-R, CD-RW, DVD-ROM, DVD±R, DVD±RW, Blu-ray (registered trademark) disc, etc.), a semiconductor memory, or a similar storage medium, as a program executable by a computer. As long as the storage medium is readable by a computer or by an embedded system, any storage format can be used. An operation similar to the operation of the above-described processing can be realized if a computer reads a program from the storage medium, and executes the instructions written in the program on the CPU based on the program. The computer may, of course, acquire or read the program by way of a network.

Furthermore, an operating system (OS) working on a computer, database management software, middleware (MW) of a network, etc. may execute a part of the processing based on instructions of a program installed from a storage medium onto a computer and an embedded system. Furthermore, the storage medium according to the embodiments is not limited to a medium independent from a system or an embedded system, but may include a storage medium storing or temporarily storing a program downloaded through a LAN or the Internet, etc. Furthermore, a storage medium is not limited to one. The embodiments include the case where the processing is carried out by means of multiple storage media, and the storage media can take any configuration.

The computer or embedded system in the embodiments are used to execute each processing in the embodiments, based on a program stored in a storage medium, and the computer or built-in system may be an apparatus consisting of a PC or a microcomputer, etc. or a system, etc. in which a plurality of apparatuses are connected through a network. The computer adopted in the embodiments is not limited to a PC; it may be a calculation processing apparatus, a microcomputer, etc. included in an information processor, and a device and apparatus that can realize the functions disclosed in the embodiments by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An object holding apparatus comprising:
    a suction device including a vacuum source and configured to provide suction;
    a suction pad connected to the suction device, and configured to hold an object based on suction by the suction device;
    a proximal sensor configured to detect that the object is in close proximity to the suction pad;
    a directional control valve configured to switch between a first state where communication between a flow path connecting the suction device and the suction pad and atmosphere is allowed, and a second state where the communication between the flow path and the atmosphere is blocked;
    a first driver circuit configured to drive the directional control valve;
    a second driver circuit configured to drive the suction device;
    a pressure sensor configured to detect a pressure in the flow path; and
    a power source configured to supply power to the first driver circuit, the second driver circuit, and the pressure sensor,
    wherein the suction device is controlled to perform suction when the proximal sensor detects that the object is in close proximity to the suction pad.

2. The object holding apparatus according to claim 1, wherein the proximal sensor measures a distance to the object, and
    the suction device is controlled to perform suction when the distance is equal to or lower than a distance threshold.

3. The object holding apparatus according to claim 2, wherein the distance threshold is adjusted to a first value when a moving speed of the suction pad is a first speed, and adjusted to a second value when the moving speed of the suction pad is a second speed, the second value being greater than the first value, the second speed being higher than the first speed.

4. The object holding apparatus according to claim 3, further comprising:
    an acceleration sensor,
    wherein the moving speed of the suction pad is calculated based on a sensor signal output from the acceleration sensor.

5. The object holding apparatus according to claim 1, further comprising:
    a contact sensor configured to detect that the object is in contact with the suction pad,
    wherein the suction device is controlled to perform suction when the contact sensor detects that the object is in contact with the suction pad, regardless of a result of detection by the proximal sensor.

6. The object holding apparatus according to claim 5, further comprising:
    a controller that controls the suction device based on a sensor signal output from the proximal sensor and a sensor signal output from the contact sensor.

7. The object holding apparatus according to claim 1, wherein the proximal sensor is arranged to be placed outside of a space formed by the suction pad and the object.

8. The object holding apparatus according to claim 1, wherein the proximal sensor is arranged to be placed inside of a space formed by the suction pad and the object.

9. The object holding apparatus according to claim 1, further comprising:
    a controller that stops driving of the suction device when the pressure detected by the pressure sensor exceeds a first threshold, and initiates driving of the suction device when the pressure detected by the pressure sensor falls below a second threshold, the second threshold being equal to or smaller than the first threshold.

10. The object holding apparatus according to claim 1, further comprising:
    a vacuum tank connected to the flow path through the directional control valve,
    wherein the directional control valve is configured to switch between the first state, the second state, and a third state where communication between the flow path and the vacuum tank is allowed.

* * * * *